United States Patent [19]

Grunewald et al.

[11] Patent Number: 4,884,825
[45] Date of Patent: Dec. 5, 1989

[54] MEANS FOR ADJUSTING A BELT DEFLECTION FITTING FOR A SAFETY BELT

[75] Inventors: Hans-Joachim Grunewald, Kiebitzreihe; Klaus-Peter Mennerich, Hamburg, both of Fed. Rep. of Germany

[73] Assignee: Autoliv GmbH, Elmshorn, Fed. Rep. of Germany

[21] Appl. No.: 284,354

[22] Filed: Dec. 14, 1988

[30] Foreign Application Priority Data

Dec. 14, 1987 [DE] Fed. Rep. of Germany ....... 3742390

[51] Int. Cl.⁴ .................. B60R 21/10; B60R 22/20
[52] U.S. Cl. ................................. 280/806; 280/808; 297/473; 297/483
[58] Field of Search ............ 280/808, 806, 804; 297/470, 473, 480, 483, 486

[56] References Cited

U.S. PATENT DOCUMENTS

| 4,491,343 | 1/1985 | Fohl | 280/806 |
| 4,702,493 | 10/1987 | Escaravage | 280/808 |
| 4,702,494 | 10/1987 | Escaravage | 280/808 |
| 4,765,651 | 8/1988 | Unger | 280/808 |
| 4,795,191 | 1/1989 | Pfeiffer et al. | 280/808 |

Primary Examiner—Kenneth R. Rice
Attorney, Agent, or Firm—Spensley Horn Jubas & Lubitz

[57] ABSTRACT

In a means for adjusting a belt deflection fitting 11 for a safety belt 12, in particular the upper belt end or deflection fitting of a three-point automatic belt, comprising a holding profile 16 on which the belt deflection fitting 11 is displaceably guided in remotely controlled manner 36 and is blockable in various shift positions, with regard to a simple lightweight and reliable design of the means on the holding profile 16 a control member 28 is displaceably guided, on the control member 28 a gear 24 is rotatably mounted which continuously meshes with an immovable complementary engagement profile 22 in the region of the holding profile and the belt deflection fitting 11 is connected to a detent element 31 blocking the gear 24 under belt tensile load.

16 Claims, 3 Drawing Sheets

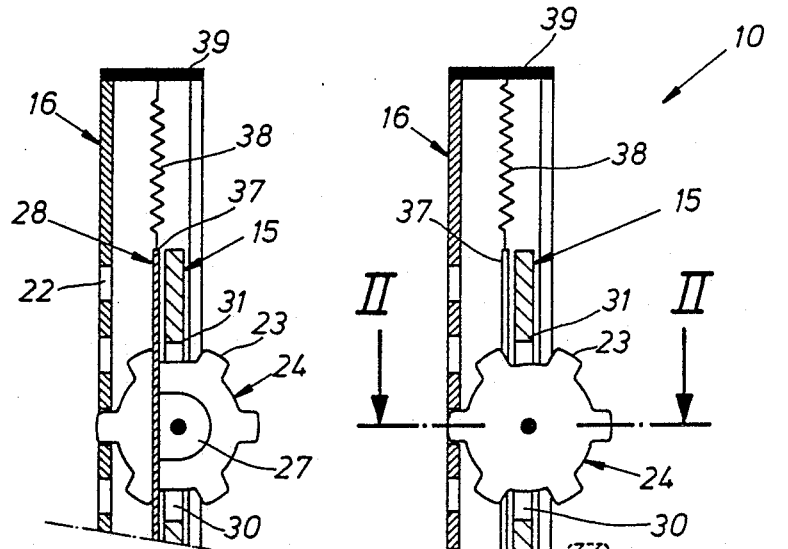
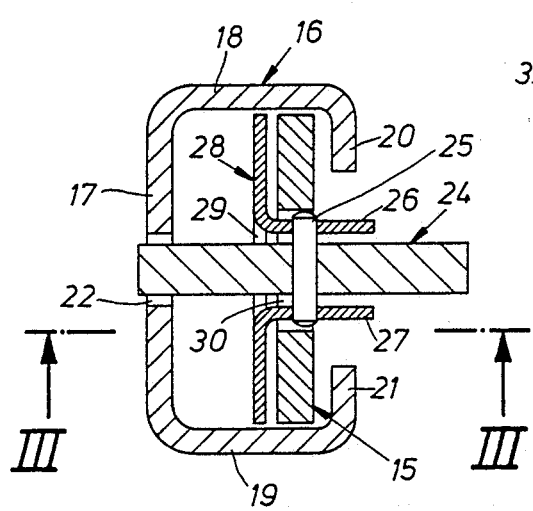
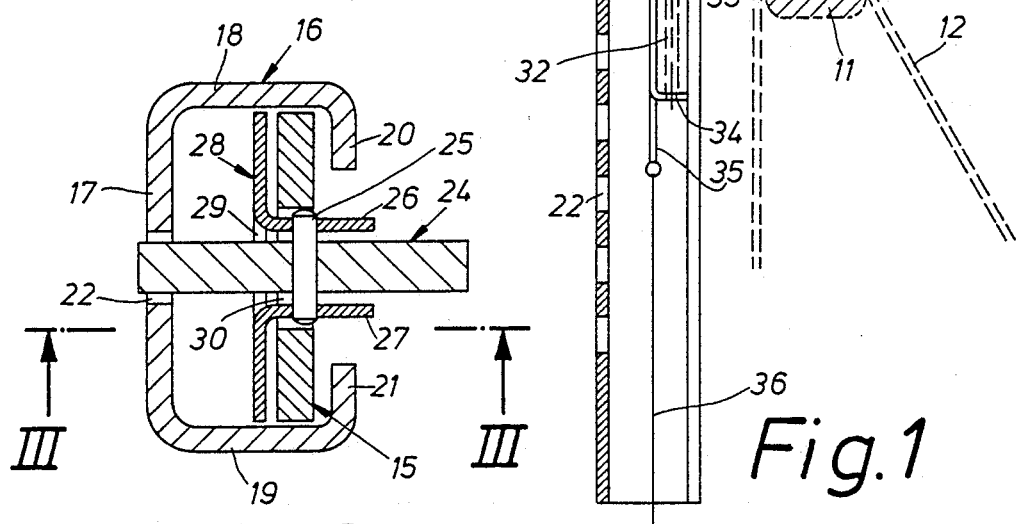

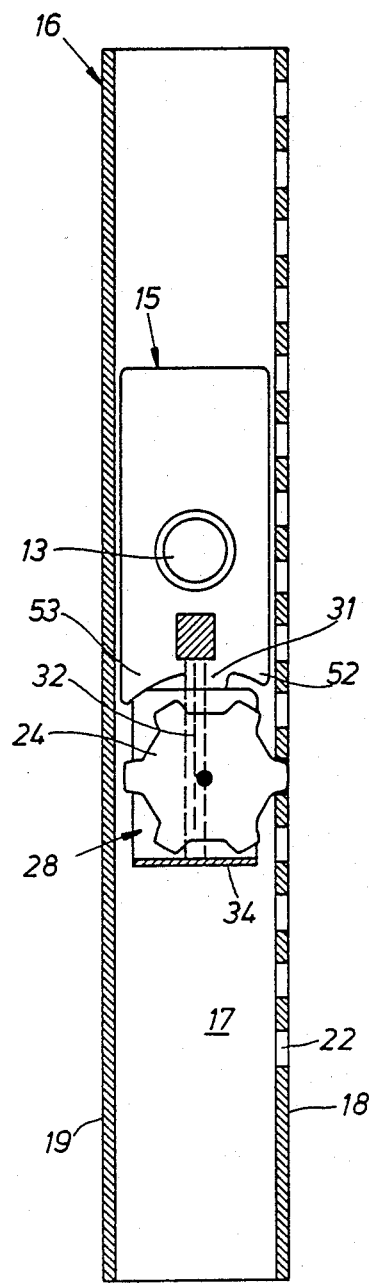
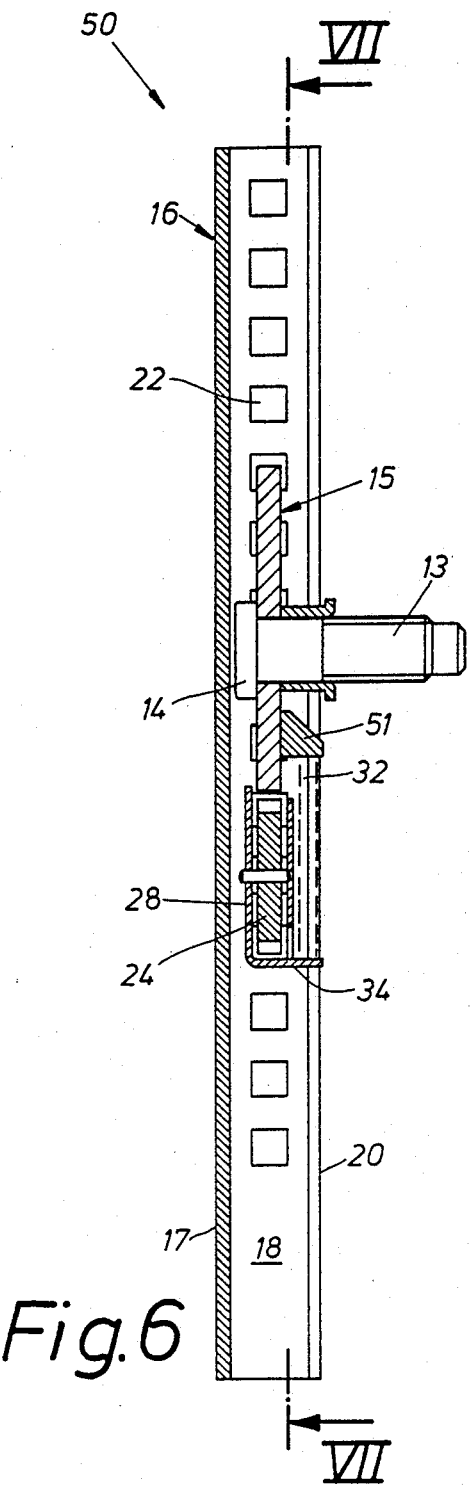
Fig.7
Fig.6

MEANS FOR ADJUSTING A BELT DEFLECTION FITTING FOR A SAFETY BELT

The invention relates to a means for adjusting a belt deflection fitting for a safety belt, in particular the upper belt deflection fitting of a three-point automatic belt, comprising a holding profile on which the belt deflection fitting is guided displaceably with remote actuation and can be blocked in various shift positions.

With such an adjusting means the belt fastening conditions are to be adapted to the body size of the belt wearer with regard to improving the safety belt effect. Solutions are already known in which the upper belt deflection fitting after releasing a detent button by hand is displaceable and lockable by letting the button go in the new shift position. The operation of said means is very uncomfortable and tedious.

Furthermore, an adjusting means of the upper deflection point is known in which an electric motor actuates a spindle drive. Although this solution is simple in manipulation it is unfavourable as regards the weight of the necessary components and the expenditure involved in implementation.

The invention is based on the problem of providing a means for adjusting a belt deflection fitting having a simple structure which can be made with light weight and operates reliably.

According to the invention this problem is solved by the features characterized in claim 1. Preferred features which further develop the invention in advantageous manner are contained in the subsidiary claims.

The invention provides in advantageous manner a simply constructed light-weight and safely and reliably operating adjusting means for belt deflection fittings in which on the holding profile a control member is displaceably guided and on said control member a gear is rotatably mounted which continuously meshes with an immovable complementary engagement profile in the region of the folding profile and in which the belt deflection fitting is connected to a detent element blocking the gear under belt loading. The control member provided forms with the gear a unit which can be individually adjusted in simple manner both manually and automatically, for example by means of a cable means coupled to a seat longitudinal adjustment.

According to a preferred embodiment of the invention the detent element is biased against its engagement direction with a spring, preferably with respect to the control member, the detent element advantageously engaging the gear in the direction in which the belt deflection fitting tends to move under belt loading. Consequently, a tensile loading of the belt leads to immediate actuation of the detent element to hold the gear reliably in the set shift position of the belt guide or end fitting. If on the other hand the safety belt is not subjected to tensile load the belt deflection fitting can easily be individually adjusted on the holding profile section.

According to a further embodiment of the invention the holding profile comprises two oppositely disposed guide portions, the engagement profile for the gear being formed in the holding profile. The holding profile is preferably made substantially U-shaped, the profile legs being the guide portions at least for the control member and the engagement profile being formed by holes in the web. Alternatively, in favourable manner the engagement profile can be formed in a guide portion. For the arrangement of the gear in the latter alternatives an axis of rotation either parallel to the web or parallel to the profile legs can be provided.

The detent element is preferably integrally formed on a plate-like guide element which is guided in the holding profile parallel to the control member. This gives a particularly compact configuration of the device.

The control member is preferably biased with a spring in one displacement direction, for example upwardly in the case of an upper belt deflection or end fitting. For remotely actuable displacement of the control member a cable means engages on said member and is coupled mechanically to the seat longitudinal adjustment. As alternative, for displacing the control member a band engaging the gear and having complementary engagement holes is provided and is also mechanically coupled to the seat longitudinal adjustment.

According to a further development of the invention the gear comprises an additional blocking element as safety member in order to additionally secure the gear under belt load and in the event of a defect in the remote actuation. The blocking element engages the gear preferably in a region which lies diametrically opposite the engagement region of the gear in the engagement profile. As a result the advantages of a compact configuration are combined with those of an ideal force distribution in the device.

The blocking element is preferably biased in the engagement direction and pivotal via the control member out of engagement with the gear for displacing the belt deflection fitting.

According to an alternative embodiment of the invention the blocking element is biased in the engagement direction and pivotal with a hand lever out of engagement with the gear. Said hand lever may also be provided instead of a remote operation of the adjusting means.

Further details and advantages of the invention will be apparent from the following part of the description in which the invention is explained in detail with the aid of examples of embodiment with reference to the attached drawings, wherein:

FIG. 1 is a longitudinal section through a first example of embodiment of a means for adjusting a belt deflection, guide or end fitting;

FIG. 2 is a section along the line II—II of FIG. 1;

FIG. 3 is a section along the line III—III of FIG. 2;

FIG. 6 is a longitudinal section through a further example of embodiment, and

FIG. 7 is a section along the line VII—VII of FIG. 6.

Figures 4, 5:
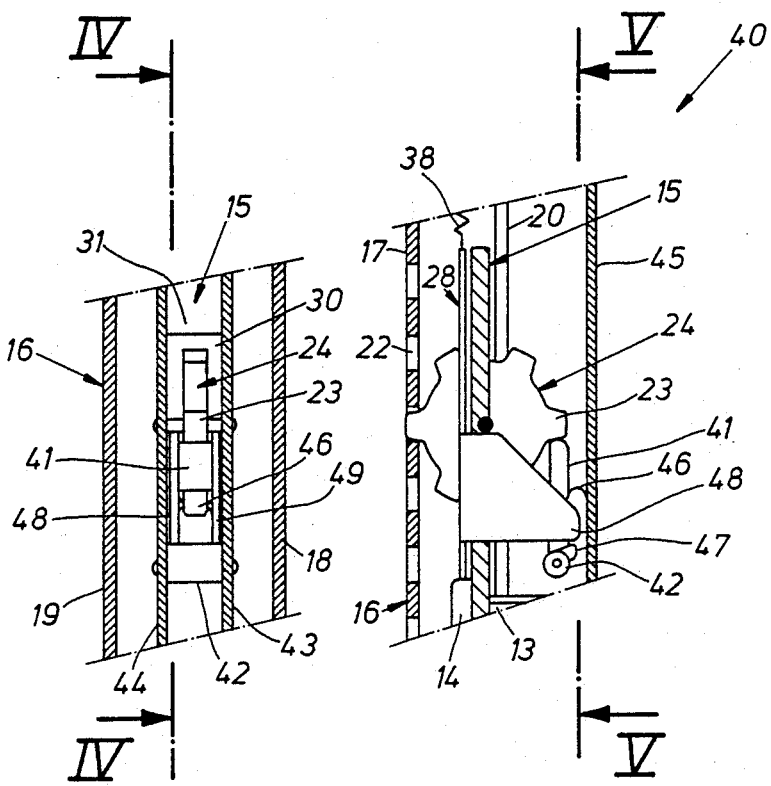
FIG. 4 is a longitudinal section through an example of embodiment modified compared with FIG. 1 and comprising a blocking or ratchet element.
FIG. 5 is a section along the line V—V of FIG. 4.

FIG. 1 is a longitudinal section through a means 10 for adjusting a belt deflection fitting 11 for a safety belt 12 indicated in dashed line. The belt deflection fitting 11 is mounted pivotally on a pin 13 in the usual manner. The pin or bolt 13 is mounted with its head 14 on a plate-like guide member 15 which is arranged slidingly displaceable in a holding profile section 16.

The holding profile 16 comprises a substantially U-shaped cross-section having a web 17 and profile legs 18 and 19. The ends 20 and 21 of the legs 18 and 19 remote from the web 17 are bent towards each other in a plane parallel to the web 17, cf. FIG. 2. Formed centrally in the web 12 are holes 22 which extend in the longitudinal direction of the holding profile 16 along the profile centre line of the web 17.

The holes 22 in the web 17 form an immovable complementary engagement profile for teeth 23 of a gear 24, i.e. the form and mutual spacing of the holes is adapted to the form of the teeth 23 and their mutual radial spacing.

The gear 24 is rotatably mounted by means of a pin 25 on bent-up lugs 26, 27 of a control member 28. The control member 28 comprises a cutout 29 through which the gear 24 passes and is in engagement with at least one of the holes 22.

The gear 24 also passes through the plate-like guide element 15 in a cutout 30, the cutout 30 being so shaped that the gear 24 can rotate unrestrictedly therein. Integrally formed on the plate-like guide element 15 is a nose-like detent element 31 which is intended for engagement between two teeth 23 of the gear 24 and is shown out of engagement in FIGS. 1 and 3. The detent element 31 engages the gear 24 in the direction in which the belt deflection fitting 11 tends to move under belt tensile loads. The detent element 31 is retained in its nonengagement position by a pressure spring 32 which engages the lower end 33 of the plate-like guide element 15 and bears against an angled portion 34 of the control member 28.

Articulately connected to the lower end 35 of the control member 28 is a wire cable 36 which in a manner not illustrated is mechanically connected to a seat longitudinal adjustment, likewise not shown. Articulately connected to the upper end 37 of a control member 28 is a tensile spring 38 which in turn is secured to the upper end 39 of the holding profile 16. The control member 28 can thus be displaced upwardly with the assistance of the tensile spring 38 in the longitudinal direction for the adjustment. Alternatively, instead of the spring 38 a wire cable may be articulately connected to the upper end 37 of the control member 28, said cable being led via a guide pulley, not shown, also to the seat longitudinal adjusting means and connected to the latter. The guide pulley is rotatably mounted in the region of the upper end 39 of the holding profile 16.

The adjustment of the belt deflection fitting 11 on the holding profile 16 is by the cable 36, the gear 24 always meshing with the holes 22 in the holding profile. If the belt 12 is subjected to tensile load the belt deflection fitting 11 moves against the action of the pressure spring 32 towards the angled portion 34 of the control member 28, the detent element 31 entering a gap between two teeth 23. As a result the gear 24 is effectively locked, a good force introduction into the holding profile 16 taking place via the plate-like guide element 15 and the detent element 31 ensuring the engagement of the gear 24 in the hole 22.

In FIG. 4 a modified example of embodiment of an adjusting means 40 is shown with a longitudinal section segment, identical parts to those in the first example of embodiment having the same reference numeral. Deviating from the means 10, the means 40 comprises an additional blocking element 41 which engages the gear 24 in a region at a tooth 23 which lies diametrically opposite the engagement region of the gear 24 in the engagement profile formed by the holes 22 on the holding profile 16.

The blocking element 41 is constructed as pivot lever which is mounted at the lower end at 42 pivotally on angled portions 43 and 44 of the plate-like guide element 15, cf. FIG. 5. Also connected to the plate-like guide element 15 is a cover 45 on which a leaf spring 46 bears which tends to press the blocking element 41 into engagement with the gear or ratchet wheel 24. The cam 47 is subjected to the action of two plate-like control profiles 48 and 49 which are arranged laterally adjacent the gear or toothed wheel and which are mounted angled on the control member 28. Via the plate-like control profiles 48 and 49 and the cam 47 the blocking element 41 is held against the action of the spring 46 on adjustment of the belt deflection fitting out of engagement with the gear 24 due to the action of the pressure spring 32. Only when the plate-like guide element 15 moves relatively to the control member 28 due to a belt tensile load is the blocking element 41 released for engagement movement thereof. The blocking element 41 may also have a hand lever which is integrally formed in the manner of an angled lever on the blocking element 41 and permits an adjustment of the means by hand.

In FIGS. 6 and 7 a further example of embodiment of an adjusting means 50 is shown. An important difference compared with the adjusting means 10 is that the holes are not provided in the web 17 but in the profile leg 18 and that the toothed wheel or gear 24 is mounted about an axis perpendicular to the web 17 rotatably on the control member 28, the lower portion 34 of which is again biased by means of a pressure spring 32 with respect to the plate-like guide element 15. The spring 32 engages a lug 51 which is mounted on the plate-like guide element 15. For reasons of simplification in FIGS. 6 and 7 the cable engaging the angled portion 34 and the spring or a correspondingly deflected cable engaging the upper end of the control member 28 have been omitted.

A particular feature in the means 50 resides in the configuration of the plate-like guide element 15, the nose of which is arranged eccentrically of the longitudinal axis of the holding profile 16, as is the axis of rotation of the gear 24. As apparent from FIG. 7 on both sides of the trapezoidal detent element 31 curved profile portions 52 and 53 are provided which point in the engagement direction. The two profile sections 52 and 53 have substantially the same centre of curvature which coincides with the axis of rotation of the gear 24. The profile portion 53 engages further round the gear 24 than the profile portion 52. This is of significance for an additional stabilizing function when the detent element 31 comes under belt tensile load because then the engagement of the gear 24 into the corresponding hole 22 is additionally ensured by the profile section 53.

We claim:

1. Means for adjusting a belt deflection fitting for a safety belt, in particular the upper belt deflection fitting of a three-point automatic belt, comprising a holding profile on which the belt deflection fitting is guided displaceably with remote actuation and can be blocked in various shift positions,
wherein
 on the holding profile a control member is displaceably guided,
 on the control member a gear is rotatably mounted which continuously meshes with an immovable complementary engagement profile in the region of the holding profile, and
wherein
 the belt deflection fitting is connected to a detent element blocking the gear o loading of the belt.

2. Means according to claim 1, wherein the detent element is biased with a spring against its engagement direction.

3. Means according to claim 1, wherein the detent element is biased with respect to the control member.

4. Means according to claim 1, wherein the detent element engages the gear in the direction in which the belt deflection fitting tends to move under loading of the belt.

5. Means according to claim 1, wherein the holding profile comprises two oppositely disposed guide portions, the engagement profile for the gear being formed in the holding profile.

6. Means according to claim 5, wherein the holding profile is made substantially U-shaped, the profile legs being the guide portions and the engagement profile being formed by means of holes in the web.

7. Means according to claim 5, wherein the holding profile is made substantially U-shaped, the profile legs being the guide sections and the engagement profile is formed in one profile leg.

8. Means according to claim 1, wherein the detent element is integrally formed on a plate-shaped guide element which is guided in the holding profile parallel to the control member.

9. Means according to claim 1, wherein the control member is biased in a displacement direction with a spring.

10. Means according to claim 9, wherein a cable means engages the control member for the displacement.

11. Means according to claim 10, wherein the cable means comprises two cables which are each orientated in one displacement direction.

12. Means according to claim 9, wherein for displacing the control member a band engaging the gear and having complementary engagement holes is provided.

13. Means according to claim 1, wherein the gear comprises an additional blocking element.

14. Means according to claim 13, wherein the blocking element engages the gear in a region which lies diametrically opposite the engagement region of the gear in the engagement profile.

15. Means according to claim 14, wherein the blocking element is biased in the engagement direction and by means of the control member for displacing the belt deflection fitting is pivoted out of engagement with the gear.

16. Means according to claim 14, wherein the blocking element is biased in the engagement direction and for displacing the belt deflection fitting is pivotal with a hand lever out of engagement with the gear.

* * * * *